May 17, 1966 W. C. PAINTER 3,252,116

COMBINED TUNING AND STABILIZATION MEANS FOR CAVITY RESONATORS

Filed Dec. 17, 1963 2 Sheets-Sheet 1

INVENTOR.
WALTER C. PAINTER
BY
George T. Craig
Attorney

May 17, 1966 W. C. PAINTER 3,252,116

COMBINED TUNING AND STABILIZATION MEANS FOR CAVITY RESONATORS

Filed Dec. 17, 1963 2 Sheets-Sheet 2

INVENTOR.
WALTER C. PAINTER
BY
George T. Craig
Attorney

United States Patent Office 3,252,116

Patented May 17, 1966

3,252,116

COMBINED TUNING AND STABILIZATION MEANS FOR CAVITY RESONATORS

Walter C. Painter, Bethel Park, Pa., assignor to Radio Corporation of America, a corporation of Delaware Filed Dec. 17, 1963, Ser. No. 331,286
1 Claim. (Cl. 333—83)

The present invention relates to improved tunable cavity resonators compensated against frequency variation in response to temperature change, and particularly to a novel tuning arrangement for such resonators whereby tuning is substantially independent of temperature changes.

An object of the present invention is to provide a novel combined tuning means and temperature compensation means for a cavity resonator.

Another object of the present invention is to provide a novel combined capacity tuning means and capacity tuning temperature compensation means for cavity resonators.

A further object of the present invention is to provide a novel combined tuning means and temperature compensation means for a cavity resonator with provision for separate adjustment of each of these means.

Most economically feasible metals that can be used in cavities expand and contract with temperature variations and, therefore, cavity resonators made from such metals are inherently temperature sensitive as far as resonant frequency is concerned. In power apparatus such as a radio transmitter where the cavity (cavity resonator) is used at the higher frequencies, 450 mc. (megacycles) for example, with a 20% duty cycle, the cavity temperature can vary as much as 80° C. or more. This temperature variation and resulting detuning of the cavity can cause as much as a 2 to 1 variation in power output from the transmitter. The invention is particularly useful in this type of apparatus.

In accordance with the present invention, a capacity tuning means and a means having an additional capacity tuning effect, the capacity effect of which varies with temperature, are located in a cavity resonator in a manner to maintain the selected tuning of the cavity substantially constant by the combined effect of these means.

Among the advantages of the invention are that a given cavity can be tuned over a wide frequency range and temperature-compensated at any frequency in this range; the degree of temperature compensation being variable over a wide range from no compensation to over-compensation; and when a tube is used in association with the cavity, the tube may be replaced since compensation is provided for different tube tolerances.

The invention will be described in greater detail by reference to the accompanying drawing in which.

Figures 1, 2, 3:
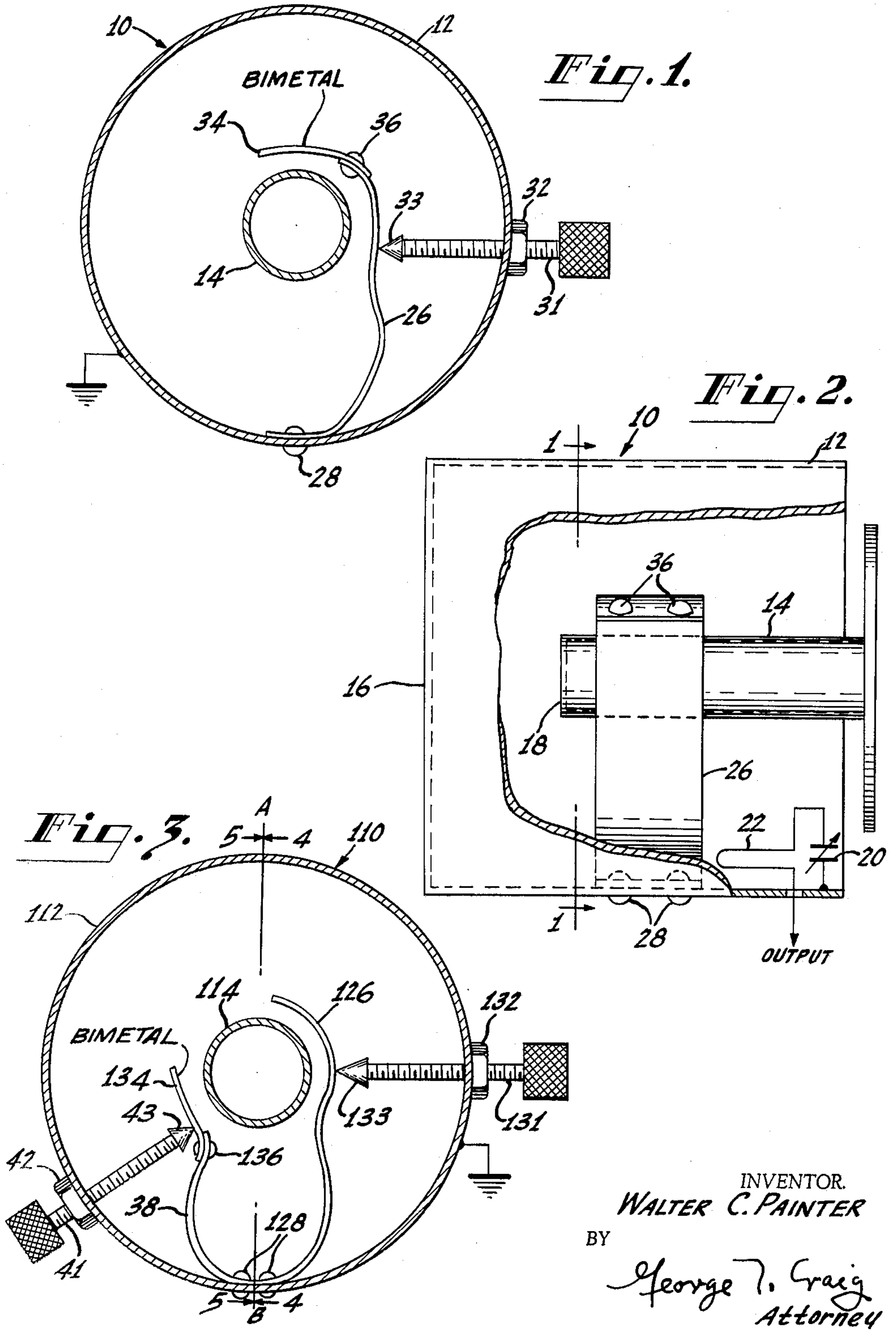
FIGURE 1 is an end view in section on line 1—1 of FIGURE 2 of a cavity resonator embodying the invention in one form.
FIGURE 2 is a view in side elevation of the cavity resonator of FIGURE 1 with a part broken away to show the interior construction.
FIGURE 3 is a view similar to FIGURE 1 showing a modification.

FIGURES 1 and 2 of the drawing show a cavity resonator 10 composed of cylindrical outer cavity wall 12, and an inner tubular conductor 14.

One use of a cavity resonator, for example, is to provide a tuned circuit for an electronic device, such as a power amplifier utilizing a vacuum tube. The cavity 10 is shown for purposes of illustration as having an outer cavity wall 12 and an inner conductor 14. Any known and suitable means for feeding the resonator and obtaining an output therefrom may be employed. For example, the end wall may be modified in any suitable way (not shown) to permit connection of the output electrode of a vacuum tube (also not shown) to the end 18 of the inner conductor 14 and an output connection may be obtained from the interior of the cavity by an output connection comprising trimmer capacitor 20 and an output link 22. These output devices are known and need not be further described. For example, if the load is an antenna, the capacitor 20 may be used to tune the antenna.

The main tuning capacitor for the cavity resonator 10 comprises a capacitor plate 26 shown as being in the form of a strip of conductive material fastened at one end in any suitable manner, as by rivets 28 to the outer cavity wall 12. The capacitor plate 26 extends into the cavity from the side wall 12 and is spaced from the inner conductor 14 over a portion of its length which is substantially coaxial with the inner conductor.

In one form of the invention, the resonant frequency of the cavity is determined by its physical dimensions and the capacitor plate 26 permits adjustment of the resonant frequency. Economically feasible metals expand and contract with temperature variations and result in inherent instability as far as resonant frequency is concerned. For example, when the cavity is used in the 450 mc. (megacycles per second) power amplifier with the duty cycle pointed out above there is a large variation in power output as well as over dissipation in the output tube.

Adjustment of the desired resonant frequency of the cavity resonator 10 is provided by an adjustment screw 31 which is threaded into a hole tapped to receive the screw 31 in threaded relationship and a lock nut 32. The screw 31 is provided with an insulating tip 33.

To maintain the resonant frequency in spite of temperature changes, a temperature responsive bimetal strip 34 is attached in any suitable manner, for example by rivets 36, to the capacitor plate 26. The total capacitive tuning effect is thus provided by the plate 26 and the bimetal strip 34. As the plate 26 and the associated bimetal strip 34 are moved inwardly toward the inner conductor 14 by additional insertion of the screw 31, the resonant frequency of the cavity is lowered. To provide optimum compensation of frequency with respect to temperature change, the materials of the bimetal strip are selected so that flexure of the strip occurs in a linear manner over the operating temperature range expected. Also, it is advantageous to select a bimetal combination which can, like the remainder of the cavity, be silver plated to lower the high frequency resistance. Also, the low expanding side of the bimetal strip is in the radial direction toward the wall 12. Ordinarily as temperature increases, the cavity volume increases, tending to decrease the resonant frequency. The bimetal strip, however, flexes away from the center conductor 14, decreasing the total capacity, tending to increase the resonant frequency. Hence the total effect is that the cavity is nearly independent of the ambient temperature.

While in the illustrative example of FIGURES 1 and 2 the bimetal strip is located with the low expanding side facing the wall 12 it will be understood that the bimetal strip can be placed in the cavity in such a way as to add or subtract capacity as the temperature increases, thereby compensating for frequency detuning of the cavity in either direction of frequency change.

Figure 4:
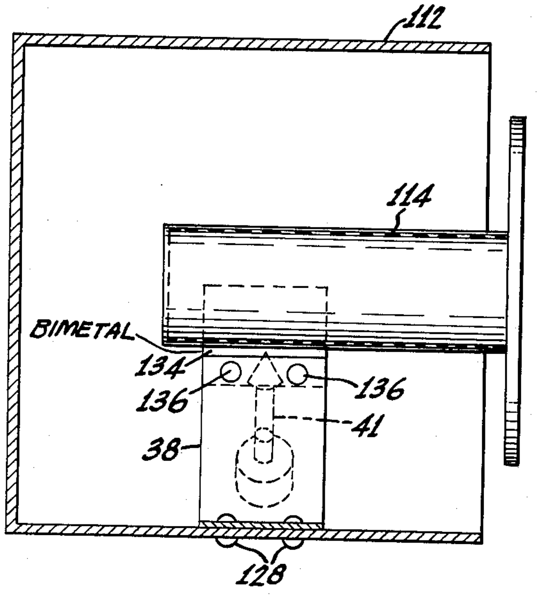
FIGURE 4 is a view in section on line A–B on FIGURE 3 as viewed in the direction of the arrows 4—4.
Figure 5:
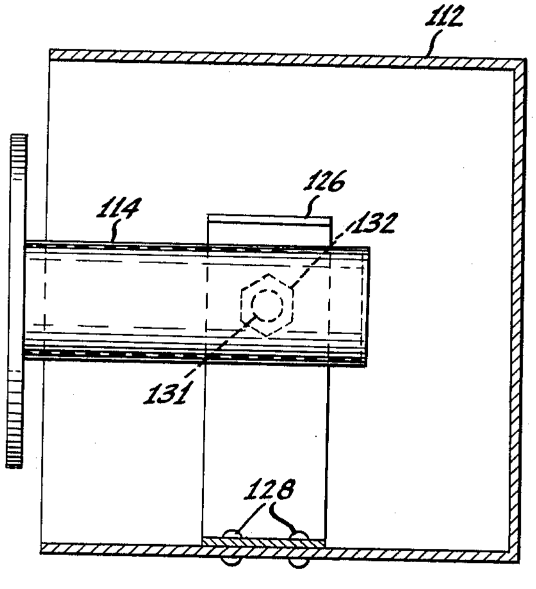
FIGURE 5 is a view in section on line A–B on FIGURE 3 as viewed in the direction of the arrows 5—5.

FIGURES 3, 4 and 5 show a modification of the present invention in which the total capacity tuning effect on the cavity resonator 110 is also made up of the capacitance of the capacitor plate 126 and the bimetal strip 134. In the modification of FIGURE 3, the capacity tuning effect of the capacitor plate 126 and the bimetal strip 134 are separately adjustable. This provides an adjustable temperature coefficient of capacity change with respect to temperature change.

The bimetal strip is secured to one end 38 of the capacitor plate 126 by suitable means, for example rivets 136. The capacitor plate 126 is secured to the outer cavity wall by rivets 128, or the like. It will be understood that end 38 may be a piece of conductive material separate from the conductive capacitor plate 126, but connected to the outer cavity wall 112.

The capacitor plate 126 is adjustable by the screw 131 and lock nut 132. The screw is provided with an insulating tip 133. The bimetal strip 134 is adjustable by a screw 41 and lock nut 42. The screw 41 is also provided with an insulating tip 43.

The bimetal strip 134 is a separately adjustable part of the total tuning capacity and it is possible with this arrangement to completely eliminate the bimetal stabilization by moving the bimetal strip by means of the screw 41 until it rests against the outer cavity wall 112. On the other hand the resonant cavity 110 may be over compensated if the bimetal strip is positioned close to the inner conductor 114.

What is claimed is:

A cavity resonator comprising an outer tubular cavity wall, an inner conductor circular in cross-section substantially coaxial with said outer cavity wall, said cavity resonator having dimensions determining the resonant frequency thereof, said dimensions and resonant frequency being subject to changes due to temperature variations, means in said cavity for supplying the resonant cavity signal to an output connection, total tuning capacitor means comprising a tuning capacitor element and a separate temperature compensating capacitor element, said tuning capacitor element comprising a strip of metal which has one end supported from and connected to said outer cavity wall, and which is positioned between said outer cavity wall and said inner conductor, and which partially surrounds said inner conductor, said temperature compensating capacitor element comprising a second strip of metal which has one end supported from and connected to said outer cavity wall, said compensating capacity element further comprising a bimetallic strip having one end mechanically and electrically connected to the other end of said second strip of metal and being positioned between said outer cavity wall and said inner conductor and partially surrounding said inner conductor, tuning capacitor adjusting means for adjusting the position of said first strip of metal with respect to said inner conductor, the position of said first strip being substantially independent of temperature, said adjusting means being manually adjustable, temperature compensating capacitor adjusting means for adjusting the position of said bimetallic strip with respect to said inner conductor, said temperature compensating capacitor adjusting means being manually adjustable, each of said adjusting means being independent of the other adjusting means.

References Cited by the Examiner

UNITED STATES PATENTS

| | | | |
|---|---|---|---|
| 2,629,051 | 2/1953 | Lindenblad | 333—83 |
| 3,160,825 | 12/1964 | Derr | 333—83 |

FOREIGN PATENTS

| | | |
|---|---|---|
| 124,544 | 6/1947 | Australia. |
| 882,408 | 11/1961 | Great Britain. |
| 892,681 | 3/1962 | Great Britain. |

ELI LIEBERMAN, *Primary Examiner.*

HERMAN KARL SAALBACH, *Examiner.*

L. ALLAHUT, *Assistant Examiner.*